Sept. 29, 1959   F. L. MARTIN   2,906,302
NOZZLE VALVE FOR DISPENSING POWER FLUIDS
Filed Oct. 24, 1956
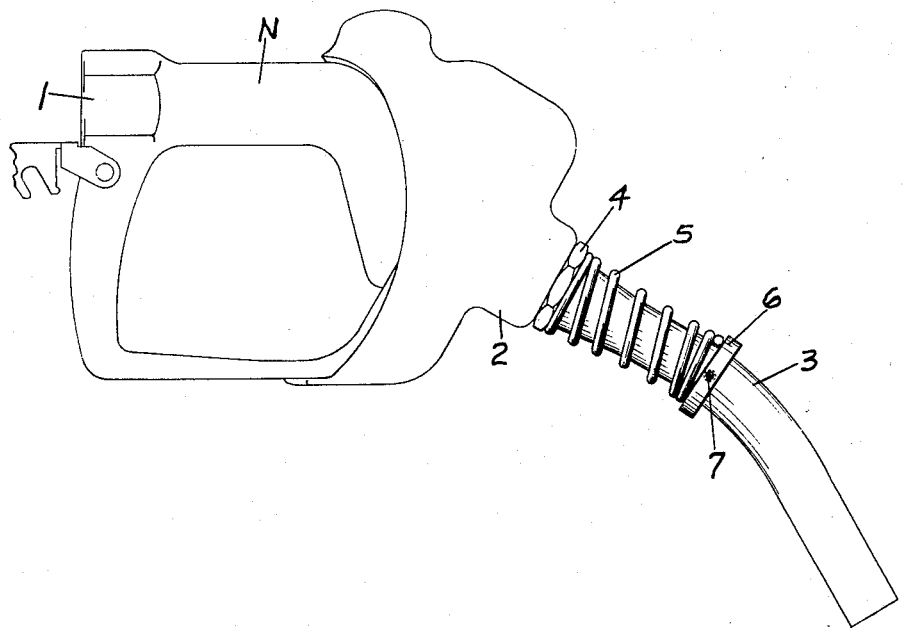
INVENTOR.
FRED L. MARTIN
BY:
Albion D. T. Libby
ATTORNEY

United States Patent Office 2,906,302
Patented Sept. 29, 1959

2,906,302

NOZZLE VALVE FOR DISPENSING POWER FLUIDS

Fred L. Martin, Littleton, N.H., assignor to OPW Corporation, Cincinnati, Ohio, a corporation of Ohio Application October 24, 1956, Serial No. 618,086

3 Claims. (Cl. 141—392)

The invention relates to improvements on automatically controlled nozzles, such as are used in handling gasoline, used in automotive vehicles of various kinds. Throughout the years wherein the automotive industry has grown tremendously, improvements have been made in the construction of the nozzles used in the fuel supply lines going to the vehicles. Some of these improvements are shown in the Duerr Patent 2,582,195, issued January 8, 1952, and the constructions shown in the patent are provided for automatically cutting off fuel going to the receiving tank of an automotive vehicle.

Another improvement is an addition of a closely fitted spiral spring to the nozzle going into the receiving tank. This spring acts to hold the nozzle in place in the inlet pipe so that the attendant can place the nozzle in the receiving position in the pipe to the receiving tank while the attendant is attending to other things, such as, wiping off the windshield of the vehicle being serviced. In many cases these springs would become loose enough so when the nozzle was pulled out of the receiving pipe, the spring came off the nozzle and went into the tank. In order to overcome this trouble, I have provided a retaining collar that is fastened to the exit nozzle in such a way that it cannot be loosened or removed without a special tool and with this construction, I have found that this collar assists in holding the nozzle in position in the receiving pipe.

These improvements are set forth in the annexed drawing, wherein,

Figure 1 is a perspective view of a nozzle made according to the Duerr patent to which I have added my improved features, the improved feature shown in Fig. 1 has to do with the retaining collar.

Referring now to the details wherein reference is made to corresponding parts, N is a valve body having an intake end 1 and an outlet end 2 which is threaded to receive the end of an exit spout 3 held securely in position by a lock nut 4 on the end of the spout 3 where it is attached to the handle portion of the valve body where is mounted a spiral spring 5 which fits tightly on the spout, and, as heretofore stated, this spring has been utilized to hold the spout within the filler neck going to the feed tank of the vehicle. After considerable use at the service station, spring 5 is quite apt to come loose and often slips off spout 3 into the tank when it is being filled. To prevent this, I have supplied a retaining collar or ring 6 which is fastened to the spout 3 by a special set screw 7 that goes below the outer surface of the retaining collar 6. This set screw being hollow at its outer end and this hollow portion being formed with sides to receive a special stem wrench. I have found that the hole in the screw and the wrench work very successfully where the form is pentagonal. As a matter of fact, this type of screw is known in the trade as the Allen type set screw and it is used in this present construction to prevent the retaining collar 6 from being tampered with. I have found from practical tests that the retaining collar should be about one and one-half inches in diameter to fit on the pipe going to the receiving tank, having an outside diameter of seven-eights of an inch, and the thickness of the collar to be about a quarter of an inch. I have found in some cases that the use of the positioning collar 6 on the spout 3 that the spring 5 may be dispensed with.

What I claim is:

1. A gasoline dispensing nozzle having a valve body including an inlet and an outlet, a rigid, unyielding tubular spout having a smooth, unobstructed exterior surface, said spout having a discharge end and an opposite end fixed to said valve body outlet, a ring type collar having an inside diameter slightly larger than the outside diameter of said spout, said collar adapted to be mounted on said spout in position intermediate said ends of said spout, said collar having a threaded transverse bore extending through its rim in a plane perpendicular to the axis of said collar, a set screw in said bore having a length preferably less than said bore and adapted to be set against said spout to adjustably mount said collar in a chosen position intermediate the ends of said spout and further to make said collar removable from said spout and a coiled spring fitting relatively close over the spout positioned in gripping relation between the said ring and the outer end of the valve, the collar when mounted in said position intermediate the ends of said spout, being adapted to engage the lip of a filler neck of a receiver to prevent inadvertent disengagement thereof during dispensing operations.

2. A fluid dispensing nozzle having a valve body including an inlet and an outlet, a rigid, unyielding tubular spout having a smooth, unobstructed exterior surface, said spout having a discharge end and an opposite end fixed to said valve body outlet, a collar having an inside diameter slightly larger than the outside diameter of said spout, whereby said collar may be mounted in operative position on said spout intermediate the ends of said spout, said collar having a threaded bore extending transversely through one side of the rim in a plane perpendicular to the axis of said collar, a set screw in said bore having a length less than said bore and being set against said spout to adjustably mount said collar in positions intermediate the ends of said spout and further to make said collar removable from said spout, a spiral spring being mounted on said spout between said valve body and said collar, said spring and said collar when mounted in position intermediate the ends of said spout being adapted to engage the lip of a filler neck of a receiver to prevent inadvertent disengagement thereof during dispensing operations.

3. A fluid dispensing nozzle for use in passing power fuel, such as gasoline, into a vehicle reception chamber, said nozzle having a valve body including an inlet and an outlet, a one piece rigid tubular spout preferably of uniform diameter throughout its length securely fastened to the valve body at its outlet end, a ring type collar having an inside diameter slightly more than the outside diameter of said spout, being carried on said spout at a choosen position, said collar having a threaded transverse bore extending through its rim toward the collar axis, a set screw positioned in said bore and having a length to engage the spout while its head is below the outer edge surface of the collar, said collar acting to control the engagement of the spout with a receiving member on a vehicle fuel container and a coiled spring fitting relatively close over the spout and positioned preferably in gripping relation between the said collar and the outer end of the valve body, the collar acting to prevent the said spring from sliding off the spout into the said fuel container when the spout is withdrawn from said container.

References Cited in the file of this patent

UNITED STATES PATENTS

| | | |
|---|---|---|
| 1,551,893 | McDonald | Sept. 1, 1925 |
| 1,566,597 | Harman | Dec. 22, 1925 |
| 1,768,356 | Harman | June 24, 1930 |
| 2,679,967 | Morrison | June 1, 1954 |
| 2,726,865 | Backhouse | Dec. 13, 1955 |
| 2,787,295 | Houghton | Apr. 2, 1957 |